United States Patent
Knappmann et al.

(10) Patent No.: US 8,036,096 B2
(45) Date of Patent: Oct. 11, 2011

(54) OPTICAL RECORDING MEDIUM FOR RETAIL ACTIVATION

(75) Inventors: Stefan Knappmann, Zimmern OB Rotteweil (DE); Michael Krause, Villingen-Schwenningen (DE); Sergey Khrushchev, Unterkirnach (DE)

(73) Assignee: Thomson Licensing, Boulogne, Billancourt (FR)

( * ) Notice: Subject to any disclaimer, the term of this patent is extended or adjusted under 35 U.S.C. 154(b) by 72 days.

(21) Appl. No.: 12/653,488

(22) Filed: Dec. 15, 2009

(65) Prior Publication Data

US 2010/0157769 A1    Jun. 24, 2010

(51) Int. Cl.
    *G11B 7/00*    (2006.01)
(52) U.S. Cl. .................................... 369/275.1
(58) Field of Classification Search .......... 369/275.1, 369/275.2, 275.3, 275.4, 275.5; 430/270.13; 428/64.1
See application file for complete search history.

(56) References Cited

U.S. PATENT DOCUMENTS

| | | | |
|---|---|---|---|
| 5,348,783 A | | 9/1994 | Ohno et al. |
| 5,882,759 A | * | 3/1999 | Hirotsune et al. ........... 428/64.1 |
| 5,958,649 A | * | 9/1999 | Hirotsune et al. ....... 430/270.13 |
| 2004/0152015 A1 | | 8/2004 | Lawandy et al. |
| 2006/0023615 A1 | | 2/2006 | Ootera |
| 2006/0114755 A1 | | 6/2006 | Eklund |
| 2006/0233057 A1 | | 10/2006 | Selinfreund |
| 2006/0234003 A1 | | 10/2006 | Selinfreund |
| 2007/0050585 A1 | | 3/2007 | New et al. |
| 2008/0165669 A1 | | 7/2008 | New et al. |

FOREIGN PATENT DOCUMENTS

WO    WO02099798    12/2002

OTHER PUBLICATIONS

Search Report dated Mar. 25, 2008.
EP Search Report dated Mar. 18, 2010.

* cited by examiner

*Primary Examiner* — Nabil Z Hindi
(74) *Attorney, Agent, or Firm* — Jeffrey D. Carter

(57) ABSTRACT

An optical recording medium to be used for a retail activation solution is proposed. The optical recording medium is a modified ROM disk that can only be played after the application of an activation process. For this purpose at least a part of a reflective layer of a read-only area of the optical recording medium is replaced by a light sensitive layer stack that changes its reflectivity upon illumination.

Also proposed are a method for producing such an optical recording medium as well as methods and apparatuses for initializing and/or activating such an optical recording medium.

13 Claims, 5 Drawing Sheets

| Ag | 100nm |
|---|---|
| $d_2$ ZnS-SiO$_2$ | 10-150nm |
| Ag$_{80}$Sb$_{20}$ | 16nm |
| ZnS-SiO$_2$ | 60nm |
| Substrate | 0.6mm |

OPTICAL RECORDING MEDIUM FOR RETAIL ACTIVATION

This application claims the benefit, under 35 U.S.C. §119 of EP Patent Application 08305997.2 filed 22 Dec. 2008.

FIELD OF THE INVENTION

The present invention relates to an optical recording medium to be used for a retail activation solution. The optical recording medium is a modified ROM disk that can only be played after the application of an activation process. The invention further relates to a method for producing such an optical recording medium as well as methods and apparatuses for initializing and/or activating such an optical recording medium.

BACKGROUND OF THE INVENTION

There is an increasing interest for a method of so called retail activation. Optical recording media that are on display in a shop should not play properly unless they are properly bought, paid for, and then activated at the point of sales. The need for activation the optical recording media serves as a theft protection.

For example, it has been proposed to leave out some necessary data on the optical recording medium, without which the optical recording medium cannot play properly. These data are then recorded on the optical recording medium at the point of sales.

However, it is not possible to use this solution for read-only optical recording media.

As an alternative, US 2007/0116920 discloses an optical recording medium having an optical data layer for storing data. The data is read from the optical data layer in an activated state. Disposed on the optical data layer is a material capable of irreversibly undergoing a morphological transformation from a first morphology to a second morphology upon interaction with an external stimulus. The morphological transformation alters the state of the optical recording medium from a pre-activated state to the activated state.

This solution is applicable to read-only optical recording media and offers some protection against theft. However, there is a problem that the external stimulus necessary for inducing the morphological transformation may also be applied by an illegitimate possessor after the theft of the optical recording medium.

US 2006/0114755 discloses a read-only optical recording medium having a an area provided with a light-sensitive layer. The light-sensitive layer is applied to a reading side of the optical recording medium and changes its reflectivity upon illumination. The light-sensitive layer blocks incoming light so that the optical recording medium is unplayable before an activation process.

SUMMARY OF THE INVENTION

It is an object of the invention to propose an optical recording medium suitable for a retail activation solution, which offers an increased security.

According to the invention, this object is achieved by an optical recording medium in which at least a part of a reflective layer of a read-only area is replaced by a light sensitive layer stack that changes its reflectivity upon illumination.

In order to produce the above proposed optical recording medium, at least a part of a reflective layer of a read-only area of the optical recording medium is replaced by a first type of light sensitive layer stack that changes its reflectivity upon illumination and serves as a reflective layer.

An idea of the present invention is to replace at least a part of the reflective layer of the ROM disk by a layer stack that changes its reflectivity upon radiation with a suitable light source. A number of such light sensitive layer stacks are known and used for recordable applications. For recording purposes high-to-low stacks are most interesting, which lower their reflectivity upon radiation with laser light. However, the reverse case of increasing reflectivity by radiation is also possible, e.g. by using materials which show a phase change from the amorphous state to the crystalline state upon laser irradiation. Examples of such material are AgInSbTe (silver, indium, antimony, and tellurium, AIST) and GeSbTe (germanium, antimony and tellurium, GST). The invention proposes to use such layer stacks for retail activation purposes. For this purpose the optical recording medium only needs to be slightly modified. The necessary modifications are relatively cheap, and mass production tools are already available.

It is known that DVD-players are very sensitive to any kind of disk defects such as black spots, scratches, finger-prints etc. The invention makes use of this by providing the optical recording medium with a light sensitive layer stack, which during an initialization step is used to create artificial defects that make the optical recording medium unplayable.

Phase change materials like GST or AIST usually have to be initialized after the sputtering process to transform the active layer from the amorphous to the crystalline state. After initialization the reflectivity of this layer can be repeatedly converted back and forth between a high reflectivity and a low reflectivity state. This necessary initialization step for phase change materials must not be mistaken with the term initialization that is used here to describe the present invention.

In the present invention the term initialization is used to describe the process of preparing an optical recording medium for the following activation process. The initialization process involves illumination of one or more areas of the optical recording medium (or the whole surface) resulting in at least two areas with different reflectivities. After initialization the optical recording medium is unplayable. The activation process is then used to align the reflectivities of the different areas to assure playability after the activation at the point of sale.

According to the invention, the light sensitive layer stack is a low-to-high layer stack with a saturation reflectivity equal to or higher than a required reflectivity, or a high-to-low layer stack with a saturation reflectivity equal to or lower than the required reflectivity.

Commercial ROM disks such as CD, DVD, BD etc. have a high reflectivity caused by a metal layer (e.g. Ag, Al). According to one aspect of the invention the metal layer is replaced by a low-to-high layer stack with a reflectivity substantially below the required reflectivity, i.e. the specified standard value. This is either done for the entire surface of the optical recording medium or only parts of the surface, e.g. the lead-in area, specific tracks or any other desired parts of the surface. Upon initialization by a laser or another intense light source the reflectivity of the low-reflectivity areas can be increased until the required value has been reached. When a special mask is used for the initialization process parts of the surface will keep their low reflectivity, whereas the reflectivity of the exposed areas increases. The resulting effect is similar to scratches and so called black spots. In case the saturation reflectivity is equal to the required reflectivity, the illumination is performed until the saturation value has been reached. In this case for the activation process no special mask is needed. In case the saturation reflectivity is higher than the required reflectivity, the illumination time and/or power needs to be precisely controlled. This acts as a further security measure.

According to a further aspect of the invention, the metal layer is replaced by a high-to-low layer stack with a reflectivity substantially above the required reflectivity, i.e. the specified standard value. Again this is either done for the entire surface of the optical recording medium or only parts of the surface. Initialization with partial illumination is performed as before, resulting is this case in non-illuminated areas having an increased reflectivity.

Depending on the shape of the mask a sequence of radial and tangential defects can be caused leading to a failure of the tracking servo, focusing servo and/or the signal processing system. For example, high reflectivity fluctuations within one rotation will cause a failure of the tracking servo. Recurrent defects with high frequencies will disrupt the signal processing system.

Advantageously, the optical recording medium further has one or more areas with a metal reflection layer having the required reflectivity. This allows to avoid the initialization process, as the areas with the metal reflection layer act as the initialized areas. As a consequence the production process of the optical recording medium becomes more complicated, as the light sensitive layer stack must only be applied to the desired areas. This helps to prevent counterfeiting of such optical recording media.

An exemplary layer stack for implementing the invention comprises an AgSb-layer or a GeSbTe-layer. This AgSb-layer or GeSbTe-layer is advantageously sandwiched between an upper and a lower ZnS—SiO2-dielectric layer. Good results are obtained when the AgSb-layer has a thickness of around 16 nm, the lower ZnS—SiO2-dielectric layer has a thickness of around 60 nm, and the upper ZnS—SiO2-dielectric layer has a thickness between 10 nm and 150 nm, preferably around 108 nm. Good results are also obtained when the GeSbTe-layer has a thickness of around 9 nm, the lower ZnS—SiO2-dielectric layer has a thickness of around 80 nm, and the upper ZnS—SiO2-dielectric layer has a thickness between 0 nm and 140 nm, According to a further refinement of the invention, the optical recording medium has at least a first area with a low-to-high layer stack and at least a second area with a high-to-low layer stack. For this purpose during manufacturing the at least first area is provided with a first type of light sensitive layer stack, whereas the at least second area is provided with a second type of light sensitive layer stack that changes its reflectivity upon illumination in a different way than said first type of layer stack.

This further improves the security of the proposed optical recording medium, as both an activation step and an initialization step are necessary to ensure playability of the optical recording medium. At the same time the shape and behavior of the different areas needs to be precisely known. Otherwise activation is hardly possible.

For initializing an optical recording medium according to the invention selected areas of the one or more areas provided with the light sensitive layer stack are illuminated with a light source using an initialization apparatus, wherein the illumination results in at least two areas with different reflectivities, which render the optical recording medium unplayable.

Upon initialization by illumination with a light source the reflectivity of the selected areas is modified. The layer stack is advantageously chosen such that the required power for the initialization process makes the use of a special lamp, e.g. a high-pressure mercury-vapor lamp, or a laser inevitable. Again this helps to prevent counterfeiting of such optical recording medium. The initialization process by illumination is preferably performed by one of the following procedures, depending on the material properties, such as the thermal conductivity, and on the area to be initialized:

Homogeneous illumination for a certain time using a mask
Scanning illumination by moving an aperture
Scanning illumination with scanning laser beam For activating an optical recording medium according to the invention the non-initialized areas of the one or more areas provided with a light sensitive layer stack are illuminated with a light source in an activation apparatus, wherein the illumination aligns the reflectivity of the non-initialized areas to the reflectivity of initialized areas to render the optical recording medium playable.

To remove the artificial defects and thus to activate the optical recording medium the formerly not initialized areas are illuminated until they reach the same reflectivity level as the rest of the optical recording medium. For this purpose the illumination time and/or power is favorably controlled by a controller. Again the layer stack is preferably chosen such that the required power for this activation process, the so-called activation power, makes the use of a special lamp or a laser inevitable. Further, it is advantageous to design the layer stack such that a power above a certain threshold, which is for example 5 to 10% higher than the activation power, destroys at least a part of the layer stack. In addition the illumination time should be limited because a longer illumination with the correct activation power may destroy the layer stack due to heat accumulation. This will effectively avoid hacking of the proposed solution.

The activation process by illumination preferably performed by one of the following procedures, depending on the material properties, such as the thermal conductivity, and on the area to be activated:

Homogeneous illumination for a certain time with or without using a mask
Scanning illumination by moving an aperture
Scanning illumination with scanning laser beam As the layer stack can be tuned such that the absorption of light is maximum for a certain wavelength, it is advantageous to use a configuration which allows to activate the optical recording medium with a wavelength which is far away from the reading wavelength. This helps to increase the read stability of the optical recording medium and to complicate the hacking. For example, if the absorption is optimized for 405 nm, it becomes more difficult to build a suitable high power light source than for 650 nm, which is closer to the infrared where high power light sources are easily available.

When the shape and the outline of the defects is known they can be easily removed at the point of sale. Depending on the level of complexity of the introduced defects the process of removing them can be made very easy or extremely complicated. Special, but rather inexpensive equipment as well as knowledge about where and how the defects have been placed are needed to remove them. At the same time the removal by radiation with light is fast and can be achieved without removing the optical recording medium from its case. For this a case with a transparent backside is favorably provided.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
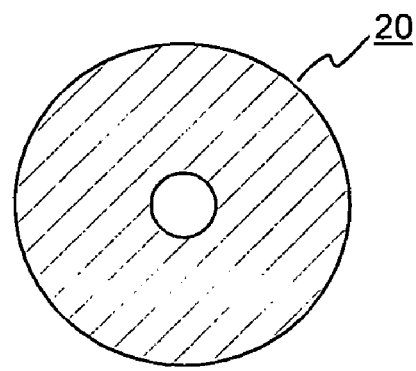
FIG. 1 an optical recording medium according to a first embodiment of the invention after sputtering.
Figure 2:
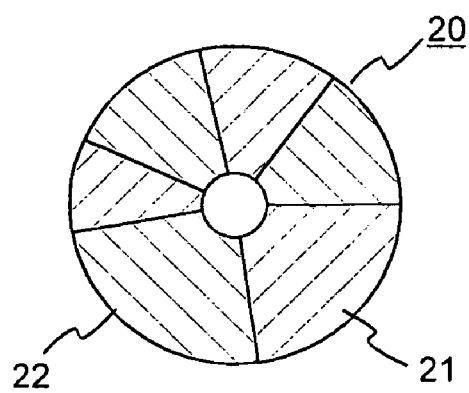
FIG. 2 depicts the optical recording medium of FIG. 1 after initialization.
Figure 3:
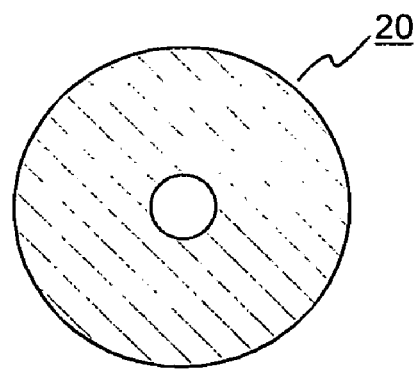
FIG. 3 shows the optical recording medium of FIG. 2 after activation.

FIG. 1, FIG. 2 and FIG. 3 show an example of the sequence of sputtering, initialization and activation, respectively, of an optical recording medium 20 according to a first embodiment of the invention. The light sensitive layer stack shows a low-to-high behavior and is chosen such that in the saturated state the reflectivity essentially equals the reflectivity required by the specification of the corresponding read-only optical recording medium.

After the sputtering the reflectivity of the optical recording medium 20 is below the required reflectivity over the whole surface area of the optical recording medium 20, as depicted in FIG. 1.

During initialization some areas 21 of the optical recording medium 20 are covered by a mask. These areas 21 keep their lower reflectivity even after initialization. Those areas 22 that are not covered by the mask during the initialization have a higher reflectivity after initialization. As shown in FIG. 2, the surface of the optical recording medium 20 has a reflectivity distribution corresponding to the mask shape. Initialization in this case is performed by illuminating the optical recording medium 20 with a sufficiently intense light source.

An activation step removes the differences in reflectivity by increasing the reflectivity of the non-initialized areas 21. As shown in FIG. 3, after activation the reflectivity is the same over the whole surface of the optical recording medium 20. The optical recording medium 20 can only be played after the activation process has been performed. In the figures, a rather simplified mask shape has been chosen for simplicity. In addition, it is likewise possible to provide some areas of the optical recording medium 20 with only a reflective layer, while other areas are provided with the proposed light sensitive layer stack. This would make the initialization step obsolete. However, manufacturing of the optical recording medium 20 would be slightly more complicated. The area with only a reflective layer may have a circular or ring shape, the shape of a sector, or even a more complicated shape. In any case, after the activation step the maximum reflectivity of the land area (e.g. R14H for DVD) should be essentially the same for all areas.

Figure 4:
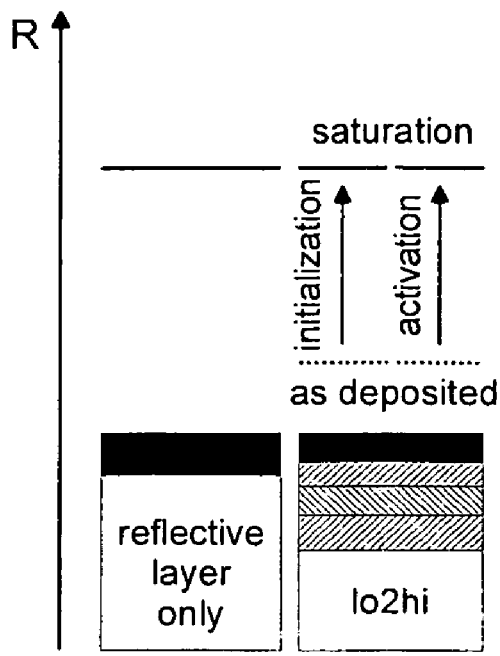
FIG. 4 depicts a diagram of the reflectivity levels for the first embodiment of the invention.

A diagram of the reflectivity levels for the first embodiment of the invention is depicted in FIG. 4. As can be seen, in its saturated state the low-to-high light sensitive layer stack has a reflectivity equal to the reflectivity of a normal reflective layer. However, before initialization or activation the reflectivity is substantially lower.

In the following a second embodiment of the invention shall be explained. According to this embodiment the light sensitive layer stack of the optical recording medium 20 is prepared and initialized in such way that even for the activation process at the point of sales a special mask is required. The shape of this activation mask is related to the shape of the mask used for initialization or, alternatively, to the shape of a mask used for sputtering. In this way the activation mask cannot be counterfeited without having knowledge about the mask used for initialization or sputtering. The second embodiment requires a more complicated activation process.

Two different ways for implementing the second embodiment shall be discussed in more detail.

Figure 5:
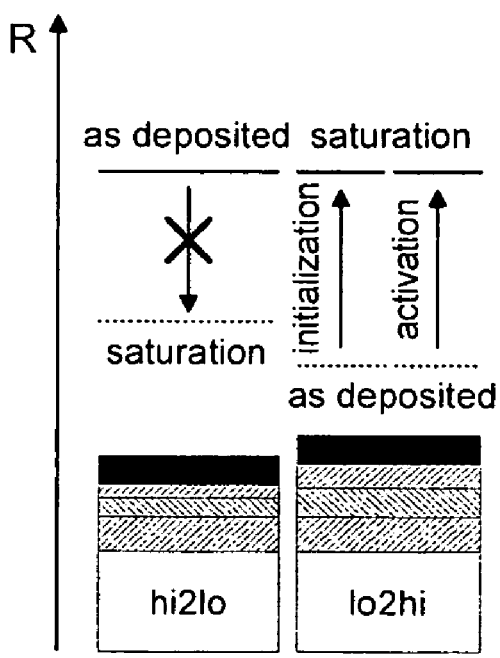
FIG. 5 shows a first diagram of the reflectivity levels for the second embodiment of the invention.

One possibility is to provide some areas of the optical recording medium 20 with a light sensitive layer stack with a high-to-low behavior, while other areas are provided with a light sensitive layer stack with a low-to-high behavior. This is preferably achieved by using a special mask during sputtering. The resulting diagram of the reflectivity levels is depicted in FIG. 5. During initialization and activation the high-to-low areas are covered by a mask, as an illumination with the initialization or activation power would decrease their reflectivity. This would make the optical recording medium 20 irreversibly unplayable. During activation the reflectivity of the low-to-high areas is increased up to the saturation level, which is essentially equal to the higher reflectivity level of the high-to-low areas. Consequently, after activation the whole optical recording medium 20 has essentially the same reflectivity. The security of this solution stems from the fact that the high-to-low areas must not be illuminated during activation. This means that activation is not possible without the correct mask. Of course, initialization is only optional for this solution, as the high-to-low areas correspond to already initialized areas.

Figures 6, 7:
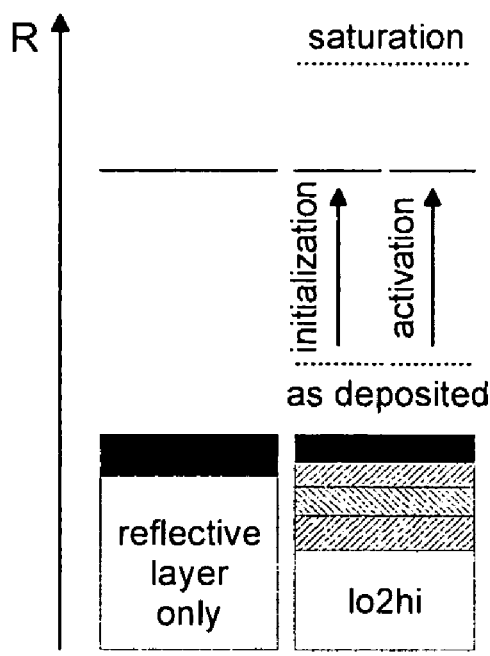
FIG. 6 depicts a second diagram of the reflectivity levels for the second embodiment of the invention.
FIG. 7 shows an exemplary light sensitive layer stack.

A second possibility is to provide some areas of the optical recording medium 20 with a normal metal reflection layer, e.g. by using a special mask during sputtering. The remaining areas of the optical recording medium are provided with a low-to-high light sensitive layer stack. The reflectivity of the metal layer does not change upon illumination and is chosen notably lower than the saturation reflectivity of the low-to-high light sensitive layer stack. The resulting diagram of the reflectivity levels is depicted in FIG. 6. In this case both the initialization and the activation of the light sensitive layer stack have to be stopped when the reflectivity level of the metal layer is reached. This requires that the reflectivity increase is controlled by the illumination time and/or power. The security of this solution stems from two different aspects.

Firstly, the activation time and/or power need to be known. Secondly, if initialized areas are illuminated again during activation new defects are generated, which means that activation is not possible without the correct mask. The activation mask has to be the inverted initialization mask. Again, initialization is only optional for this solution, as the areas with a normal metal reflection layer may be considered as already initialized areas. In this case, however, only the activation time and/or power need to be known. The mask is not needed.

Of course, the different embodiments of the invention can also be realized when the roles of low-to-high and high-to-low light sensitive layer stacks are exchanged. In this case initialization and activation are performed by reducing the reflectivity of the high-to-low light sensitive layer stacks to the required reflectivity.

FIG. 7 shows an exemplary light sensitive layer stack, which replaces the metal reflection layer. Illustrated is the case of a DVD half disk. The layer stack is usable both for a high-to-low and for a low-to-high reflectivity change. Located below a 100 nm silver reflection layer is a stack of a 16 nm AgSb-layer ($Ag_{80}Sb_{20}$) sandwiched between two $ZnS$—$SiO_2$-dielectric layers. The lower dielectric layer has a thickness of 60 nm. The upper dielectric layer has a thickness $d_2$ between 10 nm and 150 nm. The relative change in reflectivity that can be achieved with this layer stack depends on the thickness of the upper dielectric layer, which thus allows to tune the reflectivity change to a desired value.

Figures 8, 9:
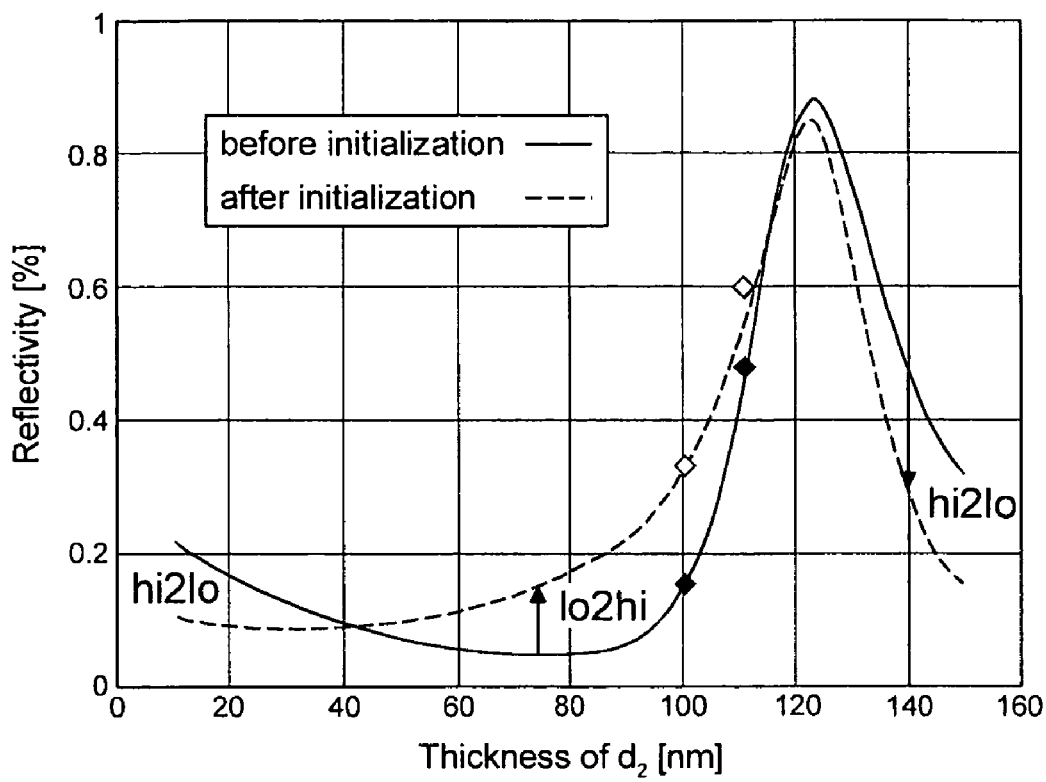
FIG. 8 depicts calculated and experimentally determined values for the reflectivity of the layer stack of FIG. 7.
FIG. 9 shows a further exemplary light sensitive layer stack.

In FIG. 8 calculated and experimentally determined values for the reflectivity of the layer stack of FIG. 7 before and after initialization are plotted against the thickness $d_2$ of the upper dielectric layer. By varying the thickness $d_2$ from 10 nm to 150 nm the contrast achieved by initialization is first high-to-low, then low-to-high (in the range 40 nm to 120 nm), and then again high-to-low. The region around $d_2=108$ nm is useful to fulfill the DVD specifications, which requires a reflectivity above 45%. With $d_2=108$ nm the simulations yield a reflectivity of 33% before and 47% after initialization or activation. Considering the reduced reflectivity, which is seen by the focused beam of a pickup, the thickness $d_2$ needs to be slightly increased to reach a reflectivity of more than 55% with parallel beam after initialization or activation.

FIG. 9 shows a further exemplary light sensitive layer stack, which replaces the metal reflection layer. Illustrated is again the case of a DVD half disk. The layer stack is usable only for a low-to-high reflectivity change. Located below a 100 nm silver reflection layer is a stack of a 9 nm GeSbTe-layer ($Ge_2Sb_2Te_5$) sandwiched between two $ZnS$—$SiO_2$-dielectric layers. The lower dielectric layer has a thickness of 80 nm. The upper dielectric layer has a thickness $d_2$ between 0 nm and 140 nm. The relative change in reflectivity that can be achieved with this layer stack depends on the thickness of the upper dielectric layer, which thus allows to tune the reflectivity change to a desired value.

Figure 10:
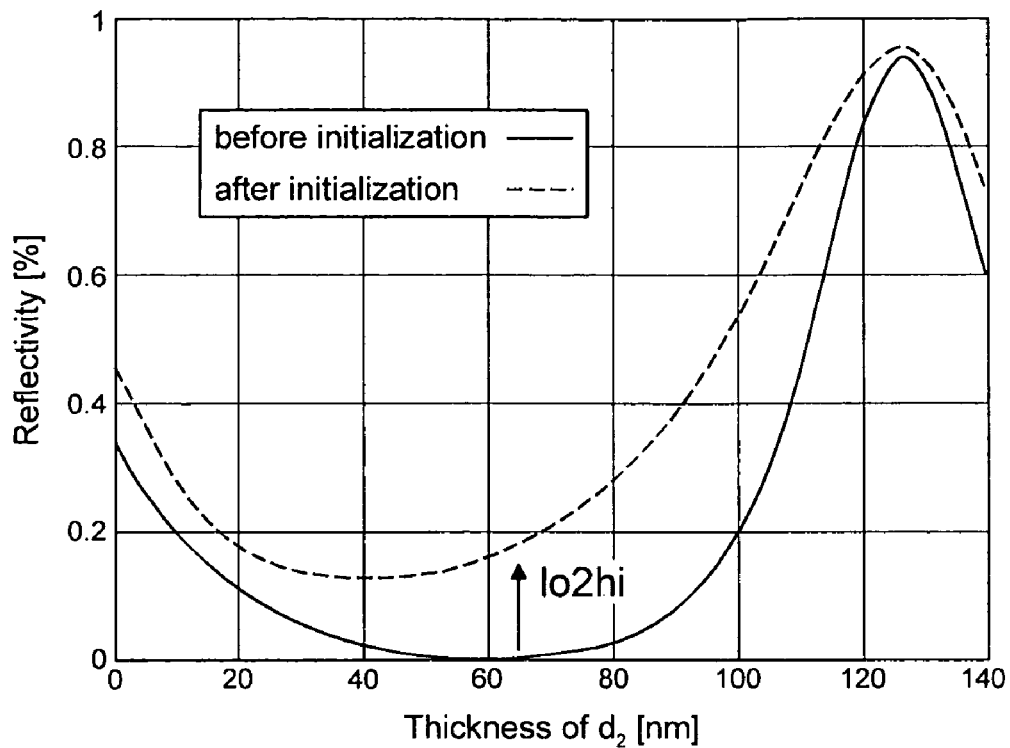
FIG. 10 depicts calculated values for the reflectivity of the layer stack of FIG. 9, and FIG. 11 schematically illustrates an apparatus for initializing or activating an optical recording medium according to the invention.

In FIG. 10 calculated values for the reflectivity of the layer stack of FIG. 9 before and after initialization are plotted against the thickness $d_2$ of the upper dielectric layer. By varying the thickness $d_2$ from 0 nm to 140 nm the contrast achieved by initialization is always low-to-high. However, the reflectivity difference between the two states significantly depends on the thickness of the upper dielectric layer.

Figure 11:
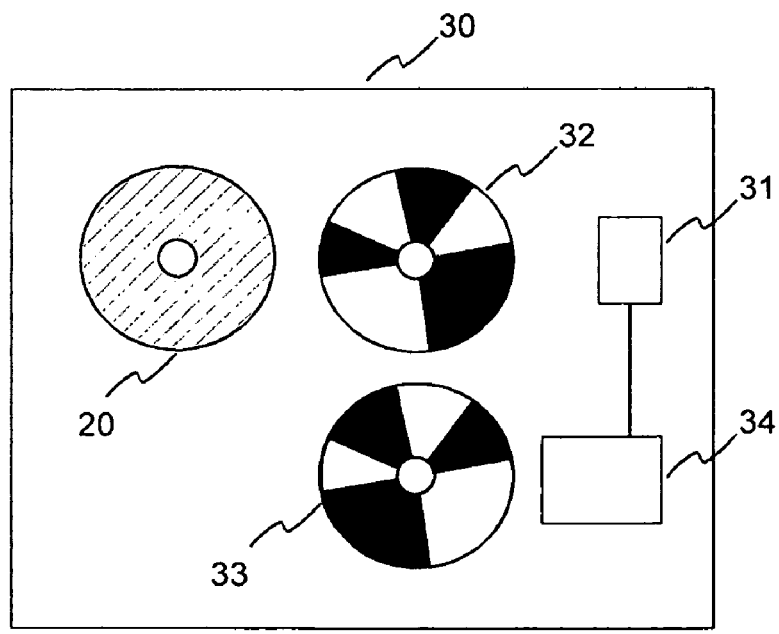

FIG. 11 schematically illustrates an apparatus 30 for initializing or activating an optical recording medium 20 according to the invention. The apparatus includes a light source 31 for illuminating selected areas of the one or more areas 21, 22 provided with a light sensitive layer stack. The selection of the areas 21, 22 to be illuminated is advantageously carried out by special masks 32, 33 that are arranged in the light path before the optical recording medium. The apparatus advantageously further includes a controller 34 for controlling the illumination time and/or power.

What is claimed is:

1. An optical recording medium with a read-only area, comprising one or more areas with a light sensitive layer stack which changes its reflectivity upon illumination and which replaces at least a part of a reflective layer, wherein at least a first part of the one or more areas with the light sensitive layer stack has a low-to-high layer stack with a saturation reflectivity equal to or higher than a required reflectivity, wherein at least a second part of the one or more areas with the light sensitive layer stack has a high-to-low layer stack with a saturation reflectivity equal to or lower than the required reflectivity, and wherein the optical recording medium is only playable after application of an activation process involving illumination of the light sensitive layer stack.

2. The optical recording medium according to claim 1, further comprising one or more areas with a metal reflection layer having the required reflectivity.

3. The optical recording medium according to claim 1, wherein the light sensitive layer stack comprises an AgSb-layer or a GeSbTe-layer.

4. The optical recording medium according to claim 3, wherein the AgSb-layer or the GeSbTe-layer is sandwiched between an upper and a lower $ZnS$—$SiO_2$-dielectric layer.

5. The optical recording medium according to claim 4, wherein the AgSb-layer has a thickness of around 16 nm, the lower $ZnS$—$SiO_2$-dielectric layer has a thickness of around 60 nm, and the upper $ZnS$—$SiO_2$-dielectric layer has a thickness between 10 nm and 150 nm, or wherein the GeSbTe-layer has a thickness of around 9 nm, the lower $ZnS$—$SiO_2$-dielectric layer has a thickness of around 80 nm, and the upper $ZnS$—$SiO_2$-dielectric layer has a thickness between 0 nm and 140 nm.

6. The optical recording medium according to claim 5, wherein the upper $ZnS$—$SiO_2$-dielectric layer has a thickness around 108 nm.

7. A method for initializing an optical recording medium according to claim 1, the method comprising the step of illuminating selected areas of the one or more areas provided with a light sensitive layer stack with a light source, wherein the illumination results in at least two areas with different reflectivities, which render the optical recording medium unplayable.

8. A method for activating an optical recording medium according to claim 1, the method comprising the step of illuminating non-initialized areas of the one or more areas provided with a light sensitive layer stack with a light source, wherein the illumination aligns the reflectivity of the non-initialized areas to the reflectivity of initialized areas to render the optical recording medium playable.

9. The method according to claim 7, wherein selection of the areas to be illuminated is performed by a mask and/or the illumination time and/or power is controlled by a controller.

10. An apparatus for initializing an optical recording medium according to claim 1, the apparatus comprising a mask for selecting one or more areas provided with a light sensitive layer stack to be illuminated, and a light source for illuminating the one or more selected areas, wherein the illumination results in at least two areas with different reflectivities, which render the optical recording medium unplayable.

11. An apparatus for activating an optical recording medium according to claim 1, the apparatus comprising a mask for selecting non-initialized areas provided with a light sensitive layer stack to be illuminated, and a light source for illuminating the selected non-initialized areas, wherein the illumination aligns the reflectivity of the non-initialized areas to the reflectivity of initialized areas to render the optical recording medium playable.

12. A method for producing an optical recording medium, wherein a read-only area of the optical recording medium is provided with one or more areas with a light sensitive layer stack which changes its reflectivity upon illumination and which replaces at least a part of a reflective layer, wherein at least a first part of the one or more areas with the light sensitive layer stack is provided with a low-to-high layer stack with a saturation reflectivity equal to or higher than a required reflectivity, wherein at least a second part of the one or more areas with the light sensitive layer stack is provided with a high-to-low layer stack with a saturation reflectivity equal to or lower than the required reflectivity, and wherein the optical recording medium is only playable after application of an activation process involving illumination of the light sensitive layer stack.

13. The method according to claim 8, wherein selection of the areas to be illuminated is performed by a mask and/or the illumination time and/or power is controlled by a controller.

* * * * *